April 2, 1957 J. R. CARTWRIGHT 2,787,415

RELAY ADDING CIRCUITS

Filed Sept. 16, 1953 3 Sheets-Sheet 1

INVENTOR
JOHN ROBERT CARTWRIGHT
BY Frederick G. Kane
ATTORNEY

INVENTOR
JOHN ROBERT CARTWRIGHT
BY [signature]
ATTORNEY

INVENTOR
JOHN ROBERT CARTWRIGHT
BY Frederick E. Hane
ATTORNEY

1

2,787,415

RELAY ADDING CIRCUITS

John R. Cartwright, Letchworth, England, assignor to The British Tabulating Machine Company Limited, London, England Application September 16, 1953, Serial No. 380,559

Claims priority, application Great Britain October 28, 1952

8 Claims. (Cl. 235—61)

This invention relates to apparatus employing electromagnetic relays for summing two or more numbers.

It has been proposed to employ three groups of relays for adding two numbers. The first and second groups of relays are energised selectively according to a predetermined code to represent the two numbers to be added. Contacts of these two groups of relays are wired in an adding chain through which the third group of relays are energised selectively to represent the sum.

In order to reduce the number of relays, it has been proposed to use two groups of relays only, and to transfer the sum on to one of the groups of relays used for registering the numbers to be added. However, this circuit employed relays with contacts which had a special mechanical latching arrangement, which was set when the relay was energised, but which did not operate the contacts until the relay was de-energised.

The object of the invention is to provide an improved relay summing circuit which uses one group of relays for registering both a number to be summed and the sum of the numbers, and which does not require relays having special contact latching arrangements.

According to the invention apparatus for summing two or more numbers has a group of electro-magnetic relays for representing each of the numbers to be summed, means for completing circuits to the relays of one of the groups, representative of the sum of the numbers and electrical delay means associated with each of the relays of said groups for preventing energisation of the relays until the summing circuit has been broken. Preferably the summing circuit comprises switches controlled by the groups of relays and the delay circuit includes a condenser which is charged through the summing circuit and is subsequently discharged through the windings of the relays of the said group.

The invention will now be described, by way of example, with reference to the accompanying drawings, in which.

The addition of two binary numbers will be considered first, since it leads to the simplest circuit which requires only two relays for each denomination.

Figure 1:
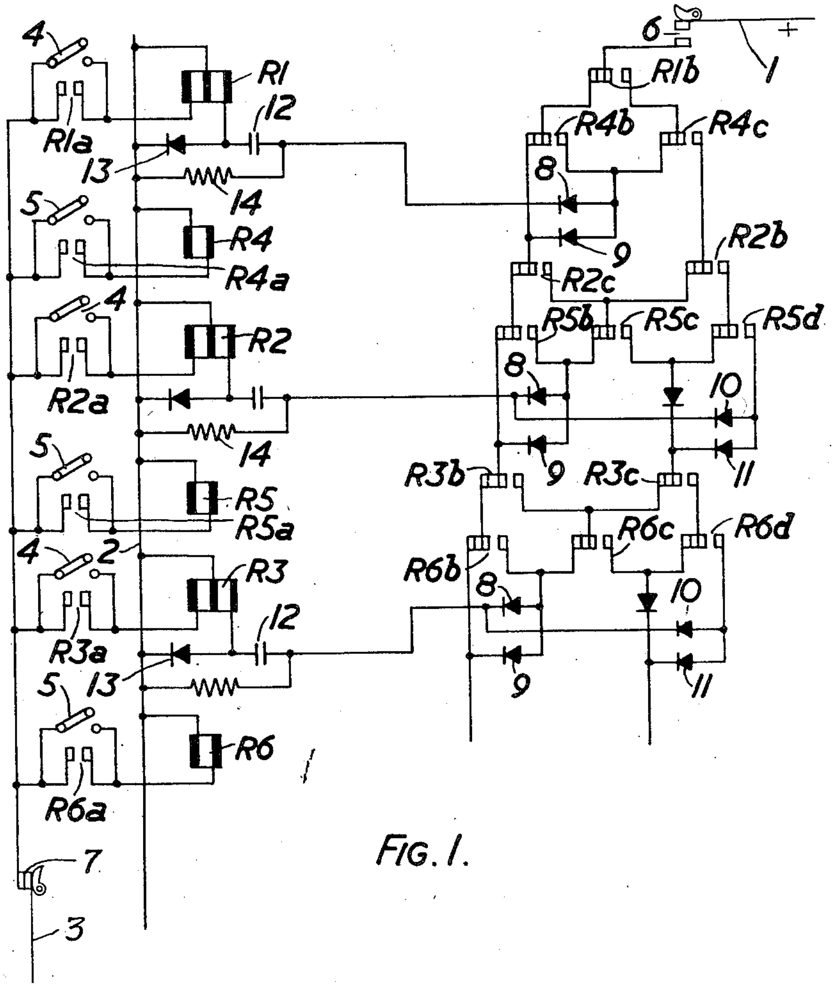
Figure 1 shows three denominations of a circuit for adding two binary numbers.

It will be appreciated that, in general, all denominations of any adding circuit, apart from the least significant denominations, are alike, since they have to add two entry digits and a possible carry from a preceding denomination. The least significant denomination has to add only the two entry digits. Accordingly only the first three denominations are shown in Figure 1, the arrangement for higher denominations being the same as that of the third denomination.

2

One binary number is entered by selectively energising through the closed contacts 7 double wound relays R1, R2 and R3 by closing switches 4 which connect one coil of the relays between supply lines 2 and 3. When the relays are energised contacts R1*a*, R2*a*, and R3*a* close to shunt the individual switches 4, allowing the switches to be re-opened without de-energising the relays. A binary one is represented by energising the corresponding relay and a binary zero is represented by an unenergised relay.

The other binary number is entered on relays R4, R5 and R6 by closing switches 5. Contacts R4*a*, R5*a*, and R6*a*, provide a holding circuit to allow the switches to be re-opened.

The pairs of relays in each denomination control contact networks which determine the sum digit and also select a different entry point to the contact network of the next higher denomination, according to whether the carry is one or zero.

In the lowest denomination the central contact of transfer contacts R1*b* is connected to a supply line 1, through a switch 6. The on and off sides of the contact R1*b* are connected to the central contact of two sets of transfer contacts R4*b* and R4*c*. There are thus four output lines from this contact network, which are energised from the line 1, when the sum of the digits is 0, 1, 1 and 2 respectively. The zero line and the two line correspond to a carry of zero or a carry of one into the next denomination. A sum of one also corresponds to a carry of zero, so that the two lines energised for this value are connected together and through an isolating rectifier, or asymmetrically conducting device, 9 to the zero line. Thus two lines enter the next denomination, one line being energised for a zero carry and the other for a one carry.

The two carry lines are connected to the centres of two transfer contacts R2*c* and R2*b*. The on and off sides of these two contacts are connected to three transfer contacts R5*b*, R5*c*, and R5*d*. The output lines from this network are energised when the sum of the two digits in this denomination, and the carry, is 0, 1, 1, 2, 2 and 3 respectively. As before, the one value lines are connected to the zero carry line for this denomination through an isolating rectifier 9. The three value line is connected to the one carry line through an isolating rectifier 11.

The contact network for the third denomination is similar to that of the second denomination and comprises contacts R3*b*, R3*c*, R6*b*, R6*c* and R6*d*.

The second coil of each of the relays R1, R2 and R3 is provided with an electrical delay circuit comprising a condenser 12, a rectifier 13 and a resistor 14. This delay circuit energises the coil of the relay only after a voltage across the resistor 14 has been removed. Except in the case in which the second binary value is zero, the entry of the sum will alter the setting of the contacts in the adding network. This results in two undesired conditions if the sum relays are energised directly. Firstly, as soon as the contacts start to change over, they break some at least, of the energising circuits, so that one or more of the sum relays may fall off again. Secondly, if the voltage is applied to the adding network for too long, there is a possibility that the second binary value will be added again to the registered sum. By feeding the delay circuit through the adding network, the registration of the sum is delayed until the voltage has been removed from the adding network, which prevents the occurrence of these undesired conditions. It has the further advantage that no current is flowing through the network at the time when it changes over, so that destructive arcing across the contacts is avoided.

The switch 6 is closed after the entries have been made, and the appropriate relay contacts have been operated. If the relay R4 was energised, then a circuit will be made from the line 1, switch 6 (closed), contact R1*b*, contact R4*b* (shifted), isolating rectifier 8, and resistor 14 to the line 2. The condenser 12 charges to the potential across the resistor 14 and the major part of this charging current flows through the rectifier 13, which presents a low impedance to current flow in this direction, compared with the impedance of the second coil of the relay R1. The small current which does flow through the coil is insufficient to operate the relay contacts.

When the condenser 12 is charged, there is no current through the coil of the relay R1 and the circuit remains in this state as long as the switch 6 remains closed. When it is desired to register the sum digits, the switch 6 is opened. At the same time the switch 7 is opened, disconnecting the hold circuits of the relays from the line 3. The condenser 12 now discharges through the resistor 14, and the coil of the relay R1 and the rectifier 13 in parallel. The rectifier presents a relatively high impedance to current flow in this direction, so that the major part of the discharge current flows through the coil and the relay contacts are operated.

Before the charge on the condenser has been dissipated sufficiently to allow the relay R1 to fall off, the switch 7 is closed again, to establish a holding circuit for the relay through the contacts R1*a*. Thus the relay remains operated to represent the sum digit one in this denomination. The switch 7 is open sufficiently long however, to ensure that all the relays have dropped out except those for which the condenser 12 was charged.

In the second and third denominations, the delay circuits can also be operated through a second isolating rectifier 10, so that the relay is operated whenever the sum digit is one or three. If only three denominations are provided, then the one carry line from the third denomination is connected to a relay, provided with a delay circuit, for registering a possible sum digit in the fourth denomination.

A further number may now be entered on the relays R4, R5 and R6 and added to the sum already stored on the relays R1, R2 and R3 in the manner just described for the initial adding operation.

Figure 1A:
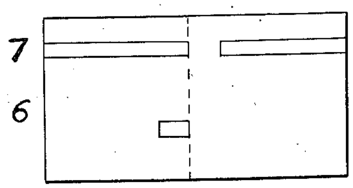
Figure 1A is a timing diagram.

The way in which the contacts 6, 7 are operated in the manner described above will be immediately obvious to those skilled in the art. For example, they may be operated by the cams illustrated diagrammatically in Figure 1, in a manner similar to that illustrated in United States Patent No. 2,635,197. Figure 1A illustrates the timing of the cams 6, 7, the cycle of the cams being initiated on the entry of the number into the relays R1—R3. From this diagram, it will be seen that the contacts 6 are closed for a short period after sufficient time has elapsed for the relay contacts to operate. The closing of contacts 6 supplies the charging pulse for the condensers 12. The contacts 7 open at the same instant as the opening of contacts 6 and remain open for a short period which is sufficient to enable the relays R1—R3 to change over but is less than the discharge time of the condensers 12.

By altering the contact network, one of the numbers may be subtracted from the other and the difference registered on the relays R1, R2 and R3. By using further groups of entering relays, the contacts of which are included in the contact network, more than two numbers may be summed simultaneously. Examples of contact networks for subtraction, and for the simultaneous addition of three numbers are shown in British patent specification No. 685,441, published January 7, 1953.

Figure 2:
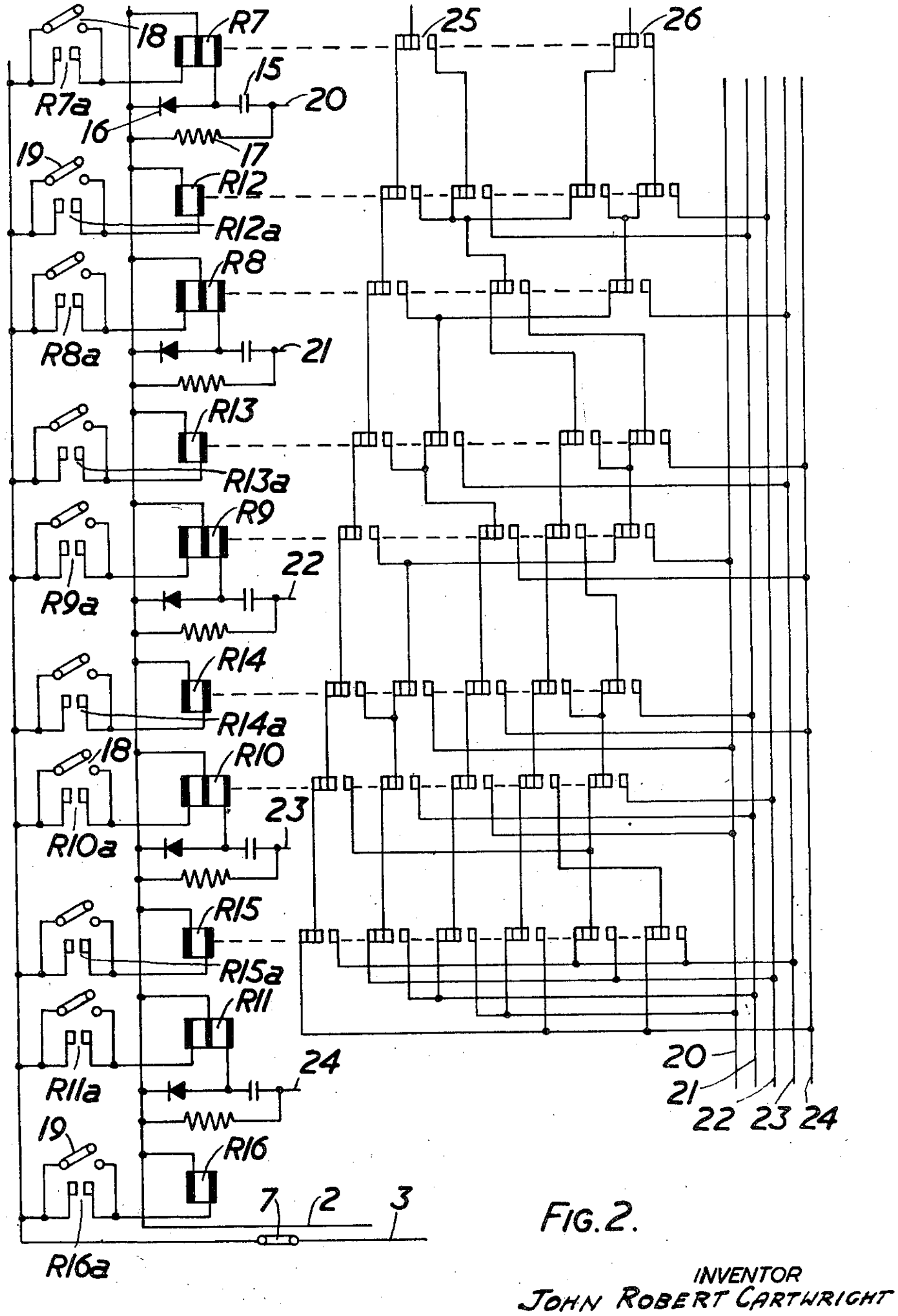
Figure 2 shows a single denomination of a circuit for determining the quinary sum digit.
Figure 3:
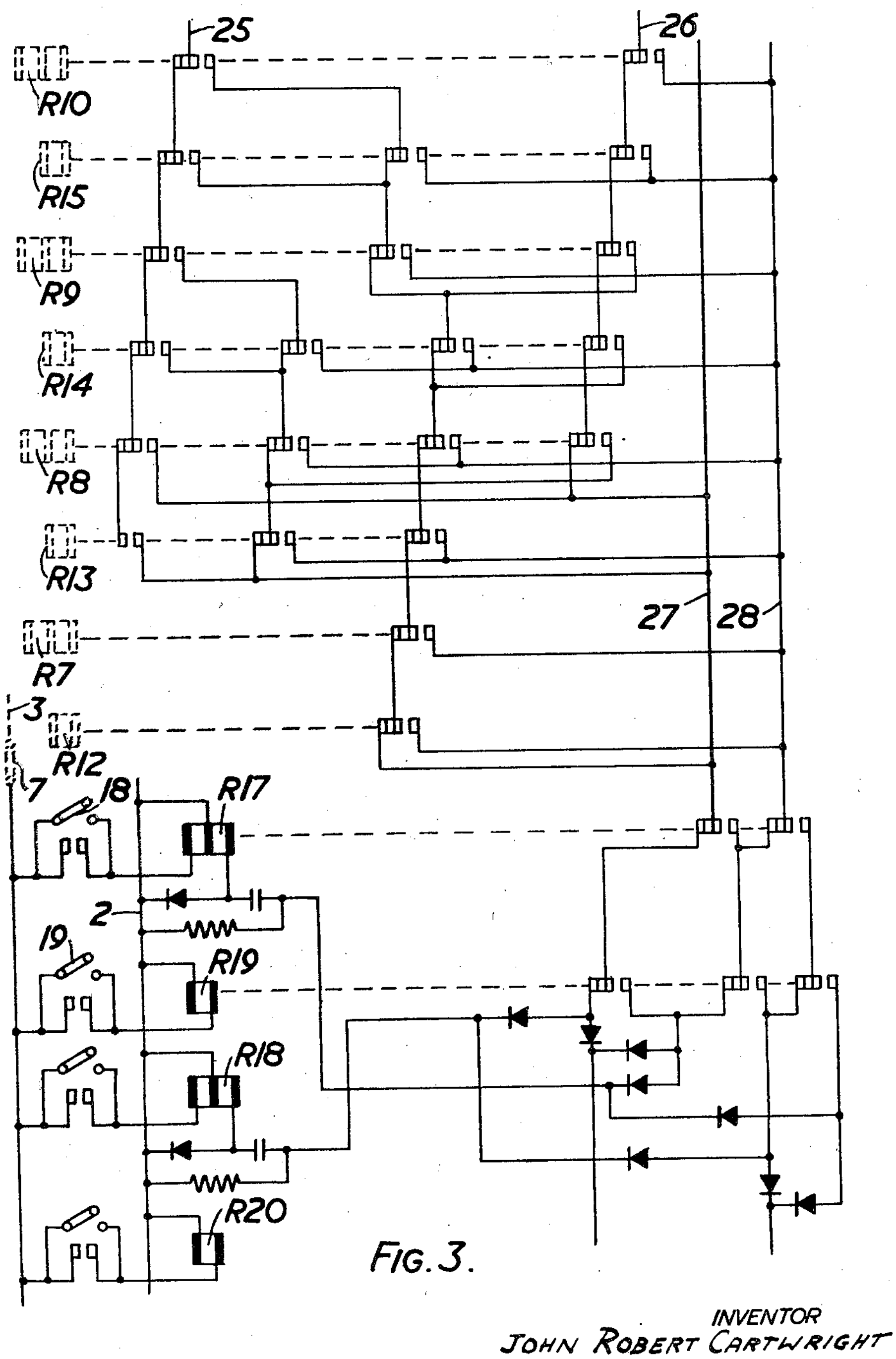
Figure 3 shows a single denomination of a circuit for determining the quinary carry and the binary digit in the addition of two bi-quinary numbers.

The same method of operation may be readily adapted to adding in other notations, such as decimal. An intermediate denomination of an adding circuit, operating in the so-called bi-quinary self-checking code, is shown in Figures 2 and 3. One decimal digit is entered on relays R7 to R11, R17 and R18 which represent the values 1, 2, 3, 4, 0, 5 and 0 respectively. Two relays representing the value 0 are used to conform to the self checking feature that two out of seven relays are energised for each of the decimal digits. Each of these relays has two coils and a delay circuit comprising a condenser 15, a rectifier 16 and a resistor 17. The relays are selectively energised to enter the digit by closure of switches 18 and establish hold circuits through their *a* contacts. Thus they correspond individually to relays such as R1. (Figure 1.)

The second digit is entered by closing switches 19, to selectively energise relays R12 to R16, R19 and R20 which represent the values 1, 2, 3, 4, 0, 5 and 0 respectively.

Unlike the binary adding network, separate adding and carry contact chains are used for the quinary relays. The fact that only one quinary relay in each group may properly be energised to register an entered value enables the contact chains to be simplified. For example, if the relays R8 and R13 are energised, no other quinary relays can be energised in this denomination and the actual quinary sum digit is affected only by the presence of a carry from a preceding denomination. Consequently, the output lines from the contacts of the relay R13 which are effective under these conditions are taken directly to the delay circuits of the appropriate relays, and not to further contacts in the chain. If a line 25 is energised, representing a carry of zero from the previous denomination, a circuit is made to a line 23 which is connected to the delay circuit of the relay R10 to register a sum digit of four. If a line 26, representing a carry of one, is energised, a line 24 is energised through the contact network. This line is connected to the delay circuit of the relay R11, which will register a sum digit of zero. The actual sum digit is five, which is equivalent to a carry from the quinary to the binary group with no remainder. This carry is determined by the carry contact chain of Figure 3, which is also energised from either the line 25 or the line 26. Similarly, lines 20, 21 and 22 are energised for sum digits of 1, 2, and 3 respectively.

If, for example, the line 26 is energised and the relays R8 and R13 are operated, the carry contact chain extends the circuit to a line 28 which forms a carry input for the adding and carry contact chain for the binary, that is 5/0, group. This contact chain is similar to that for an intermediate binary denomination of Figure 1, apart from the extra connections for operating the relay R18 which provide a positive indication of zero. If the sum of the quinary digits is less than five, a zero carry line 27 is energised.

The sequence of operation of the circuit is the same as that for the binary adder. The appropriate entries are made by closing switches 18 and 19. Voltage is then applied to the contact network through a switch (not shown) corresponding to the switch 6 of Figure 1, the switch is opened, and the holding circuit is broken and then re-established by operating the switch 7.

The advantage of the delay circuit described is that provided the sequence of switching is maintained, the timing is non-critical. In particular, voltage may be applied to the contact chain for any length of time greater than the minimum necessary to charge the condensers, without upsetting the operation of the circuit.

If the method of use of the adding circuit is such that the operation of the entry switches and the switches 6 and 7 can be mechanically synchronised, other forms of delay circuit may be used. For example, the rectifier in the delay circuit may be replaced by a switch which is closed when the switch 6 is closed and which is otherwise open. Alternatively, the resistor 14, may be replaced by a switch which is open when the switch 6 is closed and which is otherwise closed.

It will be appreciated that although only two types of adding circuit have been shown and described the invention is equally applicable to relay adding circuits operating in other codes, such as 1, 2, 4 and 8 or in other notations, such as duo-decimal.

What I claim is:

1. Apparatus for summing two or more numbers having a group of electro-magnetic relays for each number to be summed, means for selectively energising the relays of each group to represent the numbers to be summed, a plurality of switches controlled by the relays, a plurality of condensers which are selectively charged by circuits through the switches to represent the sum of the numbers, means for breaking the selective energisation of one of the group of relays and subsequently operable means for discharging the condensers through the windings of the relays of the said group to energise them in accordance with the sum of the numbers.

2. Apparatus as claimed in claim 1 in which the electrical delay means comprises an asymmetrically conducting device in parallel with a winding of the relay, a condenser in series with the winding and a resistor connected across the series combination of the condenser and the windings.

3. Apparatus as claimed in claim 2 for summing multi-denominational numbers in which the switches are so arranged that the circuit established through them, in any denomination except the first, are dependent both on the setting of the relays in that denomination and also on whether the next lower denomination has produced a carry.

4. Apparatus as claimed in claim 3 in which the switches in each denomination are connected in chain formation and as many input points are provided to the chain as there are possible carries from the next lower denomination.

5. Apparatus as claimed in claim 4 having a single chain of contacts in each denomination which determines both the sum digit for that denomination and the carry to the next higher denomination.

6. Apparatus as claimed in claim 4 having in each denomination a chain of contacts for determining the sum digit in that denomination and a chain of contacts for determining the carry to be made to the next higher denomination.

7. Apparatus for summing at least two numbers comprising in combination a group of relays for each said number, means for selectively energising the relays of each group to represent said numbers, a source of energising current, a plurality of switches controlled by said relays and connected together to complete, on the selective operation of said switches, energising circuits from said source representative of the sum of said numbers, a separate storage device for each relay of one of said groups, connected to the corresponding energising circuit, means for breaking the selective energisation of the relays of said one group subsequent to the operation of said switches, means for de-energising said energising circuits, and means energising the relays of said one group by said storage means subsequent to the operation of both said breaking means and de-energising means in order to energise the relays of that group to represent the sum.

8. Apparatus for summing at least two numbers comprising in combination a group of relays for each said number; means for selectively energising the relays of each group to represent said numbers; means for each relay of one of said groups comprising an asymmetrically conducting device connected in parallel with the relay winding, a condenser connected in series with the winding and a resistor connected in parallel with said condenser and with said winding in series; a source of energising current; a plurality of switches controlled by said relays and connected together and to said condenser combinations to complete circuits representative of the sum of said numbers from said source to said condenser combinations and to charge selectively said condensers; means for breaking the selective energisation of the relays of said one group subsequent to the operation of said switches; and means for interrupting said circuits subsequent to the operation of said breaking means, whereby said condensers are caused to discharge through the associated relay windings to represent on the relays of said one group the sum of said numbers.

References Cited in the file of this patent

UNITED STATES PATENTS

| | | |
|---|---|---|
| 2,061,745 | Wadel | Nov. 24, 1936 |
| 2,364,540 | Luhn | Dec. 5, 1944 |
| 2,386,763 | Williams | Oct. 16, 1945 |
| 2,601,281 | Hartley et al. | June 24, 1952 |